April 12, 1932.  F. S. KINGSTON  1,853,865
ELECTRIC MOTOR
Filed June 13, 1930   2 Sheets-Sheet 1

INVENTOR
F. S. KINGSTON.

BY
Fisher, Moser & Moore.
ATTORNEYS

April 12, 1932.  F. S. KINGSTON  1,853,865
ELECTRIC MOTOR
Filed June 13, 1930   2 Sheets-Sheet 2

INVENTOR
F. S. KINGSTON
BY
Fisher, Moser & Moore
ATTORNEY

Patented Apr. 12, 1932                                          1,853,865

UNITED STATES PATENT OFFICE

FREDERICK S. KINGSTON, OF WARREN, OHIO, ASSIGNOR TO THE SUNLIGHT ELECTRICAL MANUFACTURING COMPANY, OF WARREN, OHIO, A CORPORATION OF OHIO

ELECTRIC MOTOR

Application filed June 13, 1930. Serial No. 460,878.

My invention relates to electric motors, and my object in general is to provide a single phase induction motor using the split phase method of starting, including an inductive reactance to decrease the starting current to a relatively low value. A more specific object is to provide a motor of the kind stated at a low cost without producing any material change externally in its general appearance or conventional form or shape. To attain these objects a reactance coil is preferably built within or upon one hood of the motor to utilize the iron therein, and conserve space, and to decrease the costs. Preferably, the reactance coil is also connected in series relation with the main winding of the motor, and automatic means provided for short-circuiting this reactance when the motor comes up to running speed. Preferably, the starting winding is also made with more turns than in an ordinary split-phase motor, and an inductive reactance provided to lower the starting current, the aim being to provide a split phase motor which will not require more than 15 amperes starting current but still have an ample pull-out and running torque, all as hereinafter more fully described and more concisely set forth in the claims.

Figure 1:
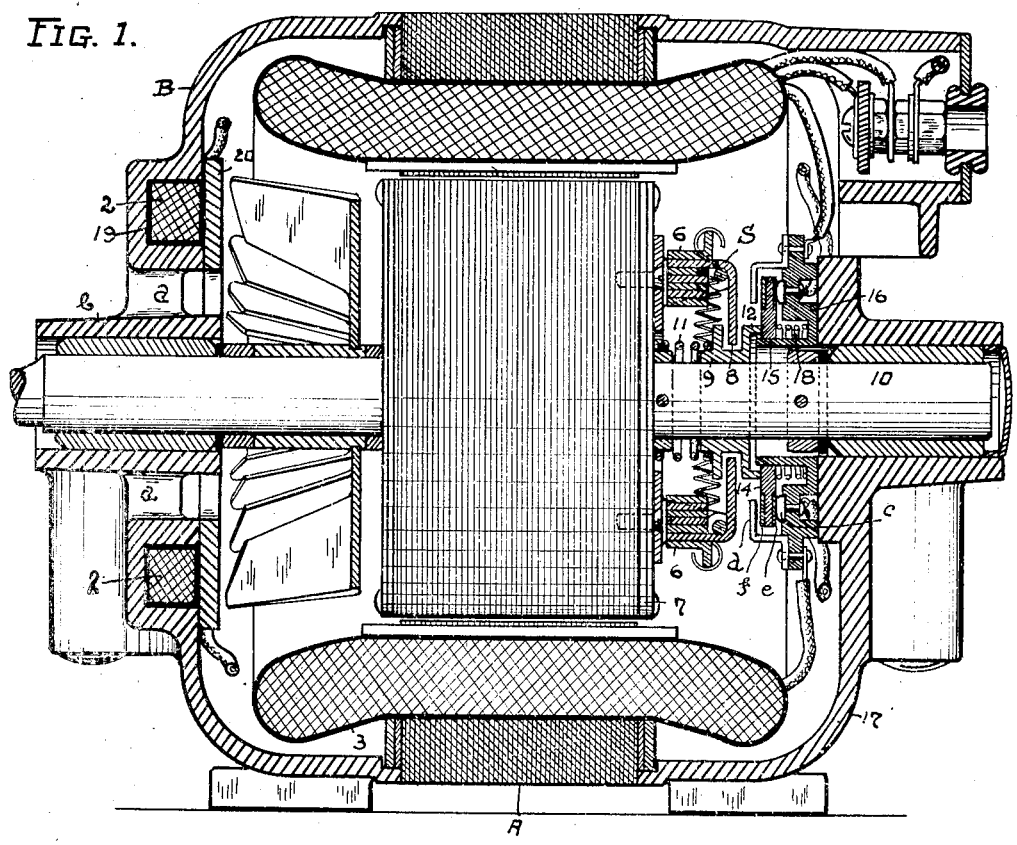
Figure 2:
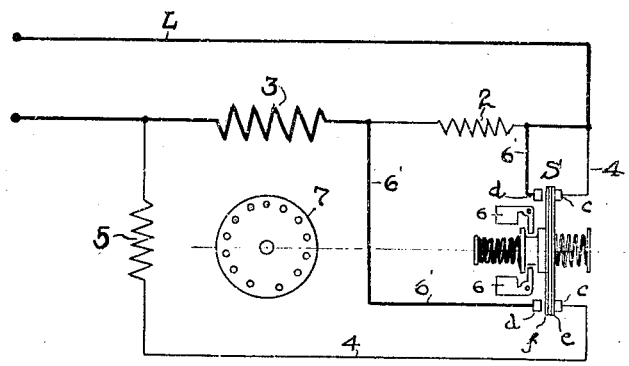
Figure 3:
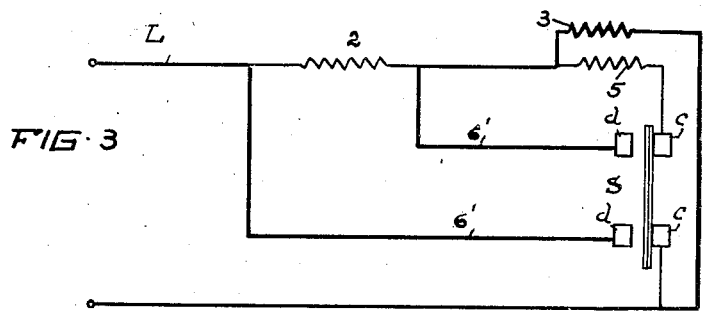
Figure 4:
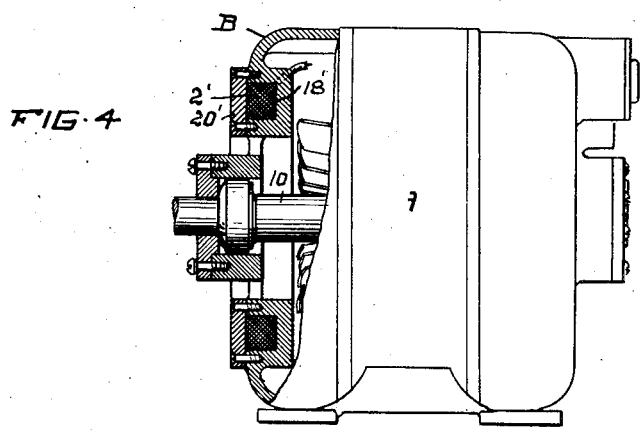
Figure 5:
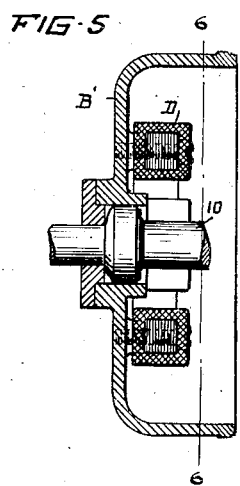
Figure 6:
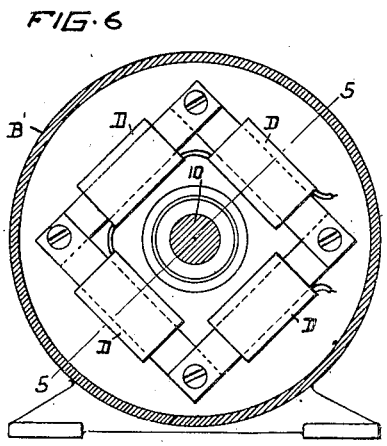

In the accompanying drawings, Fig. 1 is a sectional view of a single phase motor embodying my invention, and Fig. 2 is a schematic diagram of an electrical circuit for such a motor. Fig. 3 is a diagram representing a modified electric circuit for the motor, and Fig. 4 a sectional view and side elevation of a motor having a reactance coil mounted annularly within the outside of one end hood thereof. Figs. 5 and 6 are sectional views and elevations of a motor having a laminated core reactance mounted within one end hood, Fig. 5 being taken on line 5—5 of Fig. 6, and Fig. 6 being taken on line 6—6 of Fig. 5.

As exemplified in the drawings, motor A has the appearance of a single-phase motor of a known type, excepting that one end bell or hood —B— is provided with an annular enlargement which is channeled or grooved, either internally or externally, to receive and hold a reactance coil 2. The channeled portion of the hood encircles the motor shaft bearing —b—, at the center of the hood and also the air openings —a—, surrounding the bearing. Preferably, coil 2 is connected across the line L in series with the main field winding 3 of the motor, as shown in Fig. 2. An automatic switch S is also embodied in the motor having a double set of contacts $c$ and $d$, respectively, to cut out or open the auxiliary circuit 4 for starting winding 5, and to short-circuit reactance coil 2 in the same operation, so that the motor will continue to run only on the main field winding 3. Furthermore, automatic switch S is designed to short-circuit the reactance coil 2 when the motor is running at a relatively high speed, and to change from the running condition to the starting condition at a much lower speed. For that purpose I prefer to use a speed responsive switch having weighted centrifugal elements 6 pivotally connected to or supported at one end of rotor 7 and constructed with right-angled arms 8 operatively-engaged with a slidable collar 9 mounted on the rotor shaft 10. The centrifugal movement of each element 6 is counteracted by a coiled spring 11 sleeved over shaft 10 between the rotor and the collar, and a flange 12 on the collar is normally pressed into contact with a disk 14 of insulating material mounted to slide on the hub 15 of a switch body 16 fixed within one end of the casing or hood 17 of the motor. The separate sets of contacts $c$ and $d$ respectively, are secured to body 16, which is of insulating material and disk 14 is provided on opposite sides thereof with separate contact rings $e$ and $f$ respectively, adapted to co-operate with said separate sets of contacts. When the motor is idle or starting the coiled spring 11 keeps the contact disk pressed against the contacts $c$, thus permitting the electric current to flow through starting winding 5 in starting operations. The current also flows at the same time through reactance coil 2 and main field winding 3. This operating condition is briefly maintained, or until the rotor speeds up quickly to throw out the centrifugal elements 6 and shift collar 9 toward the rotor and apart from the contact disk 14. Thereupon a second and weaker coiled spring 18 presses the disk into engagement with the angular contacts $d$ secured to body 16. This breaks or cuts out the auxiliary starting circuit 4 and winding 5, and short-circuits the reactance coil 2 over circuit 6', thus leaving the main field winding 3 only in circuit across the line, which is the normal running condition of the motor.

Preferably, reactance coil 2 is removably confined within an annular groove or recess 19 within the end bell or hood B of the motor casing. Usually this hood is made of cast iron, and the groove or recess covered by an iron or steel ring or plate 20 to complete the iron magnetic circuit. More than one ring or plate may be used, but in either case the inductive reactance consists of the coil and its surrounding magnetic path through the iron, and the iron in the bell or hood and the plate is utilized most advantageously, notwithstanding that cast iron is not generally suitable or as desirable a material as laminated steel for inductive reactance purposes. However, in such a combination cast iron is satisfactory or good enough for all practical purposes, especially as the reactance only functions for a short period when starting and is then quickly cut out or short circuited. It is also of advantage to locate the reactance coil in or upon the hood B as it permits the coil to be covered for protection and also concealed to avoid an unsightly appearance. In fact, a reactance as constructed, requires a minimum of space and permits the motor to be made in or of conventional shape, while reducing the cost of expense of construction as compared with a reactance of the built-up laminated type. Preferably, the annular groove or recess for the reactance coil is located upon the inside of the hood, but it could also be placed outside. Thus, in Fig. 4, I show an end hood having an annular channel 18' outside encircling the motor shaft, including a reactance coil 2' within the channel, and a metal ring or plate 20' spanning the channel and covering the coil. The ring or plate might be grooved instead of the hood to receive the reactance coil thus providing a ring-shaped inductance adapted to be bolted to the hood, either inside or outside. The ring or plate may also be of laminated construction if desired, or a laminated core reactance bolted to the hood. Thus, in Figs. 5 and 6, I show a laminated core reactance device D bolted to the inside of a hood B' where it is protected and invisible from the outside, the hood retaining its conventional form and shape. The reactance in this case, as in the other forms, surrounds or encircles the motor shaft. A laminated reactance unit of this type can be bolted to the inside of the hood before the motor is assembled. When the motor is assembled the motor shaft passes through the bearing opening in the hood centrally in respect to the reactance unit.

As actually constructed, the present reactor motor has the inductive reactance connected in series with the main winding during starting as shown in Fig. 2, which is the preferred arrangement, but the reactance coil can also be connected in series with both the main winding and starting winding in starting operation and the reactance automatically short-circuited when the motor reaches a predetermined speed, as shown in Fig. 3.

Concerning the advantages and beneficial uses of the present motor, it should be understood that ordinary split-phase motors take relatively high starting currents, there being two windings in parallel across the line during the starting period,—a main winding and a starting winding, the starting current being the vector sum of the currents taken by the two windings. In the present reactor motor, the current in the main winding is kept down to a relatively low value by placing the inductive reactance in series with the main winding during the starting period, and by using more turns in the starting winding than in the ordinary split-phase motor. Thus, relatively low currents are provided in both windings during the starting period, but this arrangement does not affect the performance of the motor in the running position of the parts, because the inductive reactance is short-circuited and the starting winding is also open or cut out when the motor comes up to speed, leaving only the main winding across the voltage supply line. Accordingly, the running performance does not differ materially, from that of an ordinary split-phase motor, only the starting performance being modified to obtain a low starting current at the expense of starting torque, although considerable starting torque can be obtained by a proper design. Accordingly, a motor of the present type is suitable for loads which require only a small starting torque, or where the load is not applied until the motor reaches running speed, for example, a motor having a grinding wheel mounted on the motor shaft, and/or a motor of low cost in which no more torque is needed during the starting period than that required to overcome the motor friction and windage, and/or a motor in or with which a mechanical or speed-responsive clutch is used to permit the rotor to start freely without load. The present invention is designed to lower the cost of such motors and overcome the known difficulties of winding the same to take as low as 15 amperes starting current, even when the rotor is permitted to start freely without load. This is because the main winding must be so proportioned that the motor will have sufficient pull-out torque, and in that case the starting current in the main winding is so great that the current cannot be kept down in starting to 15 amperes. If the windings are proportioned in such motors to keep the starting current down to 15 amperes, the pull-out or maximum running torque, is insufficient or so low as to be ineffective or undesirable. In the present motor the use of a reactance as described keeps down the starting current, and does not affect the pull-out torque because the reactance is short-circuited when the motor is up to speed and the winding can be proportioned to give the desired pull-out torque. Building of the inductance reactance in the motor bell or hood is also of benefit in greatly lowering the starting current at a low cost.

In some cases a resistance could be used instead of a reactance to limit the starting current, but a resistance is not as desirable as a reactance. Thus, a coil of wire placed in the annular recess could be made a pure resistance and not an inductive reactance if non-inductively wound. For example, if half of the turns in the coil were wound in one direction and half in the other direction, the result would be substantially a pure resistance and not a reactance and the surrounding iron path would not play any part in its performance.

The system of control shown in Fig. 1, as applied to the control of a clutch unit for disengaging the load from the motor, is described and claimed in my co-pending application, Serial No. 431,750 that was filed February 27, 1930.

The centrifugal switch unit shown in connection with this application forms the subject-matter of my co-pending application, Serial No. 445,667 filed April 19, 1930.

What I claim, is:

1. The combination with a single phase induction motor of a main winding, an annularly wound inductive winding connected in series therewith, a stator carrying said main winding and having an end hood of magnetic material provided with a laterally opening annular groove in one face thereof for receiving said annularly wound inductive winding, a cover plate for substantially closing the mouth of said annular groove to thereby complete a magnetic circuit in said magnetizable material for all parts of said annular winding, a rotor, and means actuated by the speed of rotation of the rotor for electrically connecting the terminals of said inductive winding when said motor is operated at a predetermined speed.

2. In a single phase alternating current motor, the combination of a rotor, and a stator having an end hood of magnetic material, an annular groove formed in the material of said hood, an annular winding coaxial relative to said groove and completely embedded within the groove, a cover plate of magnetic material bridging said groove to thereby complete the encasement of said winding in the magnetic material of said hood, a stationary contact member carried by said stator and electrically connected to one terminal of said winding, a second stationary contact member connected to the remaining terminal of said winding, a movable contact member, and centrifugally operated means carried by said rotor for moving said movable contact member into electrical engagement with said stationary contact members when said rotor is operated at a predetermined speed.

In testimony whereof I affix my signature.

FREDERICK S. KINGSTON.